(12) United States Patent
Kotera

(10) Patent No.: US 12,475,110 B2
(45) Date of Patent: Nov. 18, 2025

(54) RANGE DETERMINATION DEVICE AND RANGE DETERMINATION METHOD

(71) Applicant: NEC Corporation, Tokyo (JP)

(72) Inventor: Masashi Kotera, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/839,054

(22) PCT Filed: Mar. 29, 2022

(86) PCT No.: PCT/JP2022/015645
§ 371 (c)(1),
(2) Date: Aug. 16, 2024

(87) PCT Pub. No.: WO2023/188029
PCT Pub. Date: Oct. 5, 2023

(65) Prior Publication Data
US 2025/0156405 A1    May 15, 2025

(51) Int. Cl.
*G06F 16/00* (2019.01)
*G06F 16/242* (2019.01)

(52) U.S. Cl.
CPC .................. *G06F 16/242* (2019.01)

(58) Field of Classification Search
CPC .................................................. G06F 16/2264
See application file for complete search history.

(56) References Cited

U.S. PATENT DOCUMENTS

| | | |
|---|---|---|
| 2017/0255682 A1 | 9/2017 | Pounds et al. |
| 2019/0334856 A1 | 10/2019 | Tanaya et al. |
| 2021/0103780 A1* | 4/2021 | Mammou ............... G06F 18/22 |

FOREIGN PATENT DOCUMENTS

JP    2015-018497 A    1/2015

OTHER PUBLICATIONS

International Search Report for PCT Application No. PCT/JP2022/015645, mailed on Jun. 14, 2022.
Michael Connor, et al., "Fast construction of k-Nearest Neighbor Graphs for Point Clouds", IEEE Transactions on Visualization and Computer Graphics, Sep. 2009, pp. 1-11.
Shoji Nishimura et al., "QUILTS: Multidimensional Data Distribution Framework Using Query-Aware and Skew-Tolerant Space-filling Curves", Feb. 27, 2017, DEIM Forum 2017 E5-3, pp. 1-8, Internet:<URL:http://dbevent.jpn.org/deim2017/papers/252.pdf> (DEIM Forum 2017 (15th Annual Meeting of the Database Society of Japan)).

* cited by examiner

*Primary Examiner* — Ajith Jacob
(74) *Attorney, Agent, or Firm* — Sughrue Mion, PLLC

(57) ABSTRACT

The range determination device 100 includes one-dimensionalization means 101 for generating multiple types of one-dimensional data from multiple multi-dimensional data using each of multiple space-filling curves, query data placement means 102 for placing query data on each of the multiple space-filling curves on which the one-dimensional data is placed, candidate area determination means 103 for determining a neighbor range of the query data on each of the multiple space-filling curves, and setting an area on each of multiple multi-dimensional planes corresponding to the neighbor range as a candidate area, and search range determination means 104 for determining an area with the smallest number of included data among multiple candidate areas as a search area.

8 Claims, 16 Drawing Sheets

FIG. 12

| SPACE-FILLING CURVE | TWO DIMENSIONS | TREE DIMENSIONS | FOUR DIMENSIONS | FIVE DIMENSIONS |
|---|---|---|---|---|
| 1 PIECE | 0.0023 | 0.028 | 0.104 | 0.238 |
| DIMENSION FACTORIAL | 0.0016 | 0.014 | 0.0446 | 0.0888 |

| TWO DIMENSIONS | TREE DIMENSIONS | FOUR DIMENSIONS | FIVE DIMENSIONS |
|---|---|---|---|
| 0.0023 | 0.028 | 0.104 | 0.238 |

RANGE DETERMINATION DEVICE AND RANGE DETERMINATION METHOD

This application is a National Stage Entry of PCT/JP2022/015645 filed on Mar. 29, 2022, the contents of all of which are incorporated herein by reference, in their entirety.

TECHNICAL FIELD

This invention relates to a range determination device and a range determination method using a space-filling curve.

BACKGROUND ART

One of the learning methods of machine learning is supervised learning. In supervised learning, the greater the number of training data, the higher the accuracy of classification and prediction. However, when the number of training data is large, the calculation time increases when machine learning using supervised learning is implemented on a computer using a primitive implementation method.

One of the machine learning methods used for regression and classification is the k-nearest neighbor algorithm. A computer with the k-nearest neighbor algorithm implemented which plots multiple training data already given in a vector space. The computer extracts k nearest neighbor points of the unknown data (hereinafter referred to as query data) from point plotted in the vector space, i.e., the training data. The computer calculates an average of the k neighbor points or takes a majority vote of the k neighbor points. Then, the computer outputs the result of the average value or the majority vote.

The computer calculates all distances between training data and query data to determine whether each point of the training data is a neighbor point of the query data. Therefore, an amount of calculation to determine whether the training data is a neighbor point of the query point is large.

In order to narrow the search range for determining whether a point is a neighbor point or not, it is possible to use a range search technique. It has also been proposed to use a space-filling curve for range search (for example, refer to patent literature 1 and non-patent literature 1).

By narrowing the search range, an amount of calculation is reduced to determine whether or not a point is a neighbor point.

CITATION LIST

Patent Literature

PTL 1: Japanese Laid-Open Patent Publication No. 2015-18497

Non-Patent Literature

NPL 1: Michael Connor, et al., "Fast construction of k-Nearest Neighbor Graphs for Point Clouds", IEEE TRANSACTIONS ON VISUALIZATION AND COMPUTER GRAPHICS, September 2009

SUMMARY OF INVENTION

Technical Problem

However, the more dimensions of the training data, the greater the amount of calculation. In the specific examples below, the amount of calculation is illustrated as the number of data in the search range (hereinafter referred to as "search area") divided by the number of training data.

FIG. 17A to FIG. 17C are explanatory diagrams for explaining a search range. As shown in FIG. 17A, suppose that there are 64 pieces of data. In FIG. 17A to FIG. 17C, the training data are indicated by black dots. As shown in FIG. 17B, when a search area is set, since the number of data is 64 and the number of training data is also 64, the amount of calculation is 64/64=1. In FIG. 17B, the inside of the rectangle indicated by a dashed line is the search area. The example shown in FIG. 17B is equivalent to no search area being set. In the example shown in FIG. 17C, the number of data is 32 and the number of training data is 64. Therefore, the amount of calculation is 32/64=0.5. In FIG. 17C, the inside of the rectangle indicated by a dashed line is the search area.

As can be seen from the above specific examples, the amount of calculation is reduced when the search area is limited, i.e., when the range search technique is used.

However, the larger the dimension of the data, the greater the amount of calculation. Hereinafter, the case of finding neighbor points of query data using the k-nearest neighbor algorithm will be used as an example.

FIG. 18 shows amounts of calculation when using the k-nearest neighbor algorithm in the search area obtained using a space-filling curve. The number of data, dimension and values were assumed to be the same with respect to the training data and the query data. The number of training data and the number of query data were 1,000,000. The value of the training data and the value of the query data are non-negative integers of [0, 1000000]. The training data and query data are uniformly distributed, respectively. A Z-curve is used as the space-filling curve.

A computer simulation was performed with the number of neighbor points is 2 and the number of dimensions of the data are 2, 3, 4, and 5.

As shown in FIG. 18, when the number of dimensions of the data is 2, the amount of calculation is 0.0023. Compared to the case using the primitive k-nearest neighbor algorithm, i.e., the k-nearest neighbor algorithm without the range search based on the space-filling curve, the amount of calculation is reduced to about $1/430$. Therefore, the amount of calculation is sufficiently small. In other words, the calculation speed is fast. The amount of calculation when using a primitive k-nearest neighbor algorithm without range search is 1.

However, when the number of dimensions of the data is 3, the amount of calculation is 0.028. Compared to the case using the primitive k-nearest neighbor algorithm, the amount of calculation is about $1/35$. When the number of dimensions of the data is 4, the amount of calculation is 0.104. Compared to the case using the primitive k-nearest neighbor algorithm, the amount of calculation is about $1/10$. When the number of dimensions of the data is 5, the amount of calculation is 0.238. Compared to the case using the primitive k-nearest neighbor algorithm, the amount of calculation is about $1/4$.

As described above, there is a problem that as the number of dimensions of the data increases, the effect of reducing the number of calculations obtained by range searches using a space-filling curve decreases.

It is an object of the present invention to provide a range determination device and a range determination method that can maintain an effect of reducing the amount of calculation by range search using a space-filling curve.

Solution to Problem

A range determination device of one aspect according to the present invention includes one-dimensionalization means for generating multiple types of one-dimensional data from multiple multi-dimensional data using each of multiple space-filling curves, query data placement means for placing query data on each of the multiple space-filling curves on which the one-dimensional data is placed, candidate area determination means for determining a neighbor range of the query data on each of the multiple space-filling curves, and setting an area on each of multiple multi-dimensional planes corresponding to the neighbor range as a candidate area, and search range determination means for determining an area with the smallest number of included data among multiple candidate areas as a search area.

A range determination method of one aspect according to the present invention includes generating multiple types of one-dimensional data from multiple multi-dimensional data using each of multiple space-filling curves, placing query data on each of the multiple space-filling curves on which the one-dimensional data is placed, determining a neighbor range of the query data on each of the multiple space-filling curves, and setting an area on each of multiple multi-dimensional planes corresponding to the neighbor range as a candidate area, and determining an area with the smallest number of included data among multiple candidate areas as a search area.

A range determination program of one aspect according to the present invention for causing a computer to execute generating multiple types of one-dimensional data from multiple multi-dimensional data using each of multiple space-filling curves, placing query data on each of the multiple space-filling curves on which the one-dimensional data is placed, determining a neighbor range of the query data on each of the multiple space-filling curves, and setting an area on each of multiple multi-dimensional planes corresponding to the neighbor range as a candidate area, and determining an area with the smallest number of included data among multiple candidate areas as a search area.

Advantageous Effects of Invention

According to the present invention, it is possible to maintain an effect of reducing the amount of calculation obtained by range search using a space-filling curve.

BRIEF DESCRIPTION OF DRAWINGS

FIG. 12 It depicts an explanatory diagram showing an amount of calculation when using the k-nearest neighbor algorithm in the search area obtained using a space-filling curve.

DESCRIPTION OF EMBODIMENTS

Hereinafter, an example embodiment of the present invention will be explained with reference to the drawings.

In the following example embodiments, taking two-dimensional data $(x_1, y_1), (x_2, y_2), \ldots, (x_m, y_m)$ as an example, each of $x_1$ and $y_1$ (l=1 to m) is expressed as "numerical value" or "element". Regarding multi-dimensional data, i.e., n-dimensional data (n>2), they are similarly expressed as "numerical value" or "element. In the following explanation, n in n-dimensional data is assumed to be 2 or more. In addition, training data and query data are assumed to be n-dimensional data.

Figure 1:
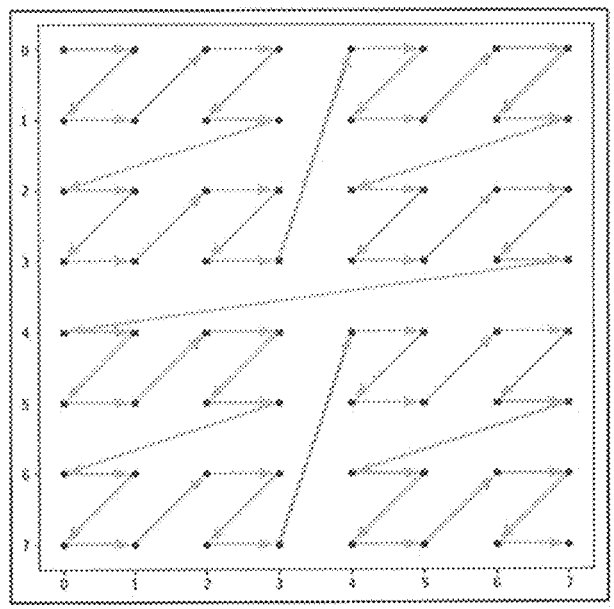
FIG. 1 It depicts an explanatory diagram for explaining mapping from n-dimensional data to one-dimensional data using a space-filling curve.
Figure 2:
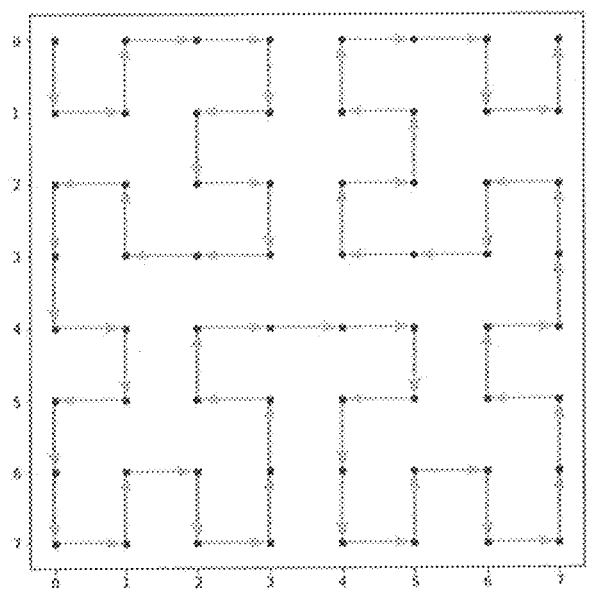
FIG. 2 It depicts an explanatory diagram for explaining mapping from n-dimensional data to one-dimensional data using a space-filling curve.

FIG. 1 and FIG. 2 are explanatory diagrams for explaining mapping from n-dimensional data to one-dimensional data using a space-filling curve. In FIG. 1, a Z-curve is shown in two-dimensional space. In FIG. 2, a Hilbert curve is shown. two-dimensional space is an example of n-dimensional space. The Z-curve and the Hilbert curve are examples of the space-filling curve.

In the following explanation, the conversion of n-dimensional data into one-dimensional data is called mapping. Arranging one-dimensional data along a space-filling curve is called sorting (ordering). In other words, one-dimensional data is sorted by the space-filling curve. In the following explanation, a space-filling curve is represented as a straight line inflected at multiple points in a two-dimensional plane, as illustrated in FIG. 1 and FIG. 2. However, a space-filling curve may also be represented as a single straight line (line segment).

Example Embodiment 1

Figure 3:
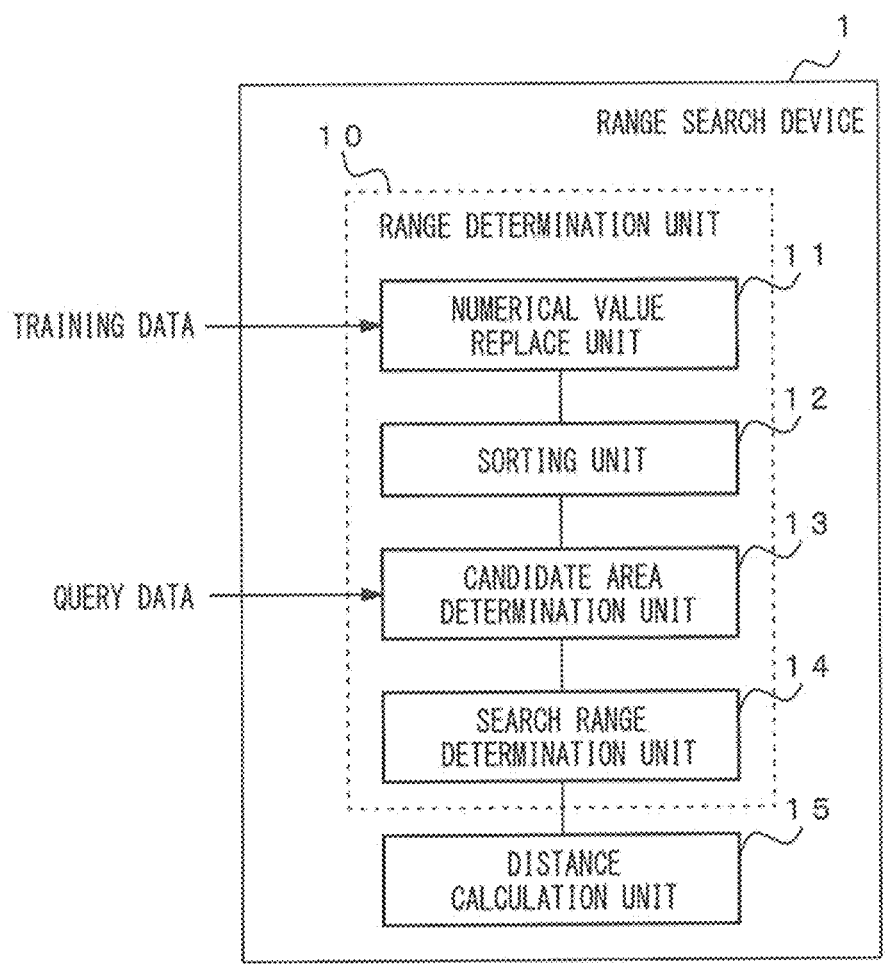
FIG. 3 It depicts a block diagram showing a configuration of the range search device of the first example embodiment.

FIG. 3 is a block diagram showing a configuration of the range search device of the first example embodiment. The range search device 1 shown in FIG. 3 comprises a numerical value replace unit (first numerical value replace unit) 11, a sorting unit 12, a candidate area determination unit 13, a search range determination unit 14, and a distance calculation unit 15.

The numerical value replace unit 11, the sorting unit 12, the candidate area determination unit 13, and the search range determination unit 14 constitute a range determination unit 10.

The numerical value replace unit 11 replaces the numerical values of the training data, i.e., the numerical values that make up the training data. The numerical value replace unit 11 outputs information indicating which numerical values have been replaced to the sorting unit 12.

The sorting unit 12 converts the training data into one-dimensional data using a specific predefined space-filling curve, i.e., one type of space-filling curve (for example, Z-curve). In other words, the sorting unit 12 obtains mapping of the training data on the space-filling curve. There are multiple training data. The sorting unit 12 can use any space-filling curve, including a Z-curve and a Hilbert curve. The sorting unit 12 can sort the training data using a space-filling curve. The sorting unit 12 obtains the index information before and after sorting the training data. The sorting unit 12 performs the above process a predetermined number of times to obtain the index information before and after sorting the training data. The index information indicates what number of data in the data set the data of interest is.

The sorting unit 12 outputs the training data, information indicating which numerical values in the training data were replaced, the result of mapping the training data on the space-filling curve, and the index information before and after sorting the training data to the candidate area determination unit 13.

The candidate area determination unit 13 performs the same numerical value replacement process on the input query data as the sorting unit 12 performed on the training data. Therefore, the candidate area determination unit 13 functions as the second numerical value replace unit.

The candidate area determination unit 13 calculates a candidate of a search area (candidate area) to be finally determined using the information input from the sorting unit 12. The candidate area determination unit 13 performs the process of calculating the candidate area a predetermined number of times.

For example, when the training data is three-dimensional data (x, y, z), there are six combinations of numerical values after replacement: (x, y, z), (x, z, y), (y, x, z), (y, z, x), (z, y, y), and (z, y, x). To generalize, when the training data is n-dimensional data, the number of combinations of numerical values after replacement is n! (factorial of n). Therefore, a value less than or equal to the factorial value of the dimension can be selected as the predetermined number of times above.

The candidate area determination unit 13 provides the training data, query data, information indicating which numerical values have been replaced, index information before and after sorting the training data, and candidate areas for the search range determination unit 14. The candidate area determination unit 13 provides the training data, query data, information indicating which numerical values have been replaced, and index information before and after sorting the training data, corresponding to each area, with multiple candidate areas, for the search range determination unit 14.

The search range determination unit 14 selects the candidate area with the lowest number of data contained among the multiple types of candidate areas provided by the candidate area determination unit 13. The selected candidate area corresponds to the determined search area. In this example, the number of data corresponds to the number of training data. The search range determination unit 14 outputs the determined search area, as well as the training data, query data, information indicating which numerical values were replaced, and index information before and after sorting the training data, corresponding to that search area, to the distance calculation unit 15.

The distance calculation unit 15 calculates distances in the n-dimensional plane between all data (in this example embodiment, training data) in the search area input from the search range determination unit 14 and query data. The distance calculation unit 15 selects k distances in descending order of value. Then, the distance calculation unit 15 sets points where the data corresponding to the selected k distances are located as the k neighbor points.

Next, an example of the use of the space-filling curve will be explained.

First, the process for mapping n-dimensional data to one-dimensional data using the space-filling curve is explained with reference to FIG. 1 and FIG. 17A. That is, the data is assumed to be two-dimensional data. The element (numerical value) of the two-dimensional data is assumed to be non-negative integer. In the example embodiment, the data of the grid points corresponds to the training data. In the example shown in FIG. 1, the data of the grid points in the two-dimensional space are sorted in the order (0, 0), (1, 0), (0, 1) . . . (7, 7) on the space-filling curve.

The mapping of n-dimensional data to one-dimensional data is performed as follows.

First, the numerical values of the grid point data are represented in binary notation. For example, when the numerical value of the two-dimensional data is (4,2), it is represented in binary as (100,10). When the number of bits in the binary representation of the data, i.e., the numerical values in the bit string, are different, they are unified to the highest number of bits. In this example, since the numbers of bits in the bit string are different, as in (100, 10), they are unified to 3 bits, as in (100,010).

The first bit of each value in the two-dimensional data in binary notation, i.e., the first bit of each bit string, is extracted. Taking two-dimensional data (100, 010) as an example, "1" is extracted for "100". "0" is extracted for "010". The two extracted values are ordered. In this example, they are ordered as "10".

The same process is performed as for the first bit for the second bit and third bit of the numerical values "100" and "010" of the two-dimensional data (100, 010).

That is, "0" of the second bit in "100" is extracted, and "1" of the second bit in "010" is extracted. Then, the extracted "0" and "1" are ordered like "01". In addition, "0" of the third bit in "100" is extracted, and "0" of the third bit in "010" is extracted. Then, the extracted "0" and "0" are ordered like "00"

Further, by combining the bit strings "10", "01" and "00" extracted from the first bit, second bit, and third bit, respectively, the bit string "100100" ("36" in decimal) is obtained.

By performing the above process on all of the n-dimensional data (in this example, two-dimensional data), the n-dimensional data is mapped to the one-dimensional data.

On the space-filling curve, the bit string "100100" corresponding to the two-dimensional data (100, 010) is placed at the 36th point. By using the space-filling curve, all n-dimensional data (in this example, two-dimensional data) are sorted. In other words, all n-dimensional data is sorted by the space-filling curve.

Figure 4A:
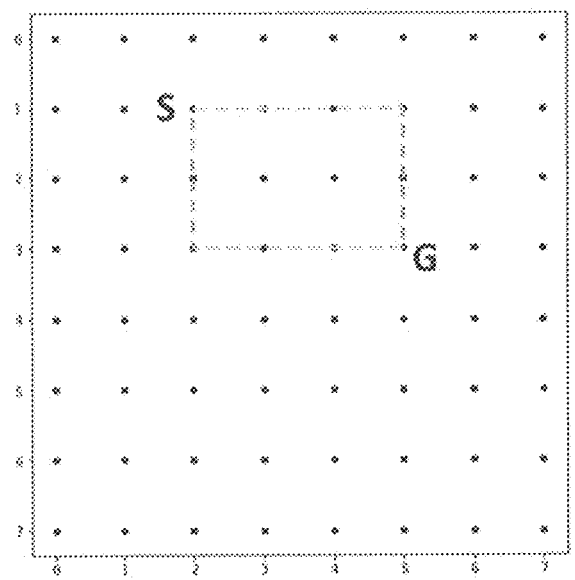
FIG. 4A It depicts an explanatory diagram for explaining a method for determining a search area using a space-filling curve.
Figure 4B:
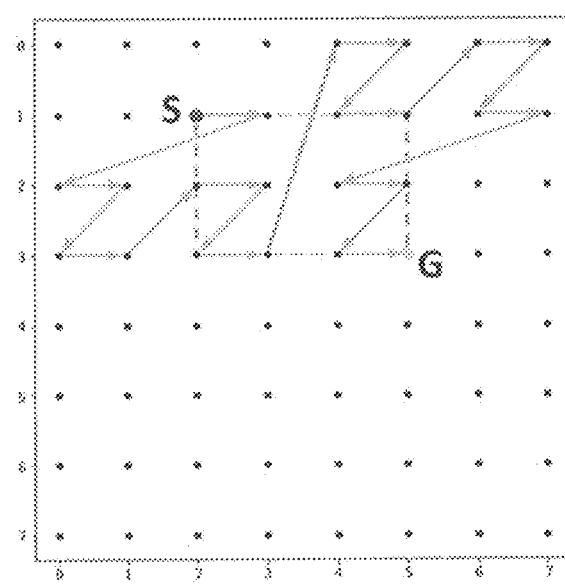
FIG. 4B It depicts an explanatory diagram for explaining a method for determining a search area using a space-filling curve.

Next, an example of a general range determination process using a space-filling curve will be explained. FIG. 4A and FIG. 4B are explanatory diagrams for explaining a method for determining a search area using a space-filling curve. The example of data arrangement shown in FIG. 17A is referred to. In addition, take the rectangular area shown by the dashed line in FIG. 4A as an example. The horizontal axis is the x-direction and the vertical axis is the y-direction in FIG. 4A. Additionally, denote the two-dimensional data as (x, y). In other words, the numerical values (elements) of the two-dimensional data are represented by x and y.

Figure 17A:
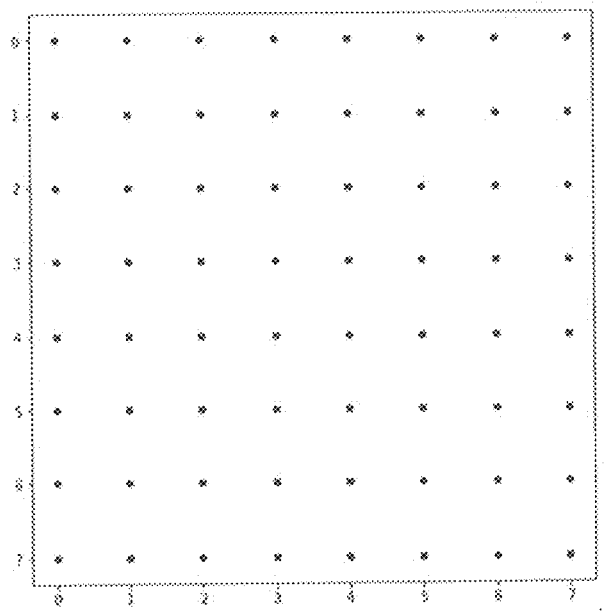
FIG. 17A It depicts an explanatory diagram showing an example of data arrangement.

A simple method to determine whether or not data is included in the area search range illustrated in FIG. 4A is to check whether or not (x, y) (x: 0 to 63, y: 0 to 63) representing the data shown in FIG. 17A satisfies $2 \leq x \leq 5$ and $1 \leq y \leq 3$. In this method, for each of the 64 pieces of data, whether or not the above two inequalities are satisfied is calculated.

When using a space-filling curve, the range search process is performed as follows.

First, n-dimensional data is mapped to one-dimensional data by the method described above. Next, where point S (numerical value of two-dimensional data: (2, 1)) with the smallest numerical value of the two-dimensional data in the area search range and point G (numerical value of two-dimensional data: (5, 3)) with the largest value in the two-dimensional data in the area search range are located on the space-filling curve is determined, for example, by binary search.

Further, in the two-dimensional plane, it is calculated whether the above two inequalities are satisfied for all points between point S and point G on the space-filling curve. In FIG. 4B, the arrows connecting the two points indicate a part of the space-filling curve. In FIG. 4B, point S, points at the end of each arrow, and point G correspond to the points between point S and point G in the space-filling curve.

In the example shown in FIG. 4B, there are 22 points between point S and point G. Therefore, the target of calculation for whether the above two inequalities are satisfied or not is 22 points. On the other hand, when the above primitive method is used, the target of calculation for whether the above two inequalities are satisfied or not is 64 points.

Figure 17B:
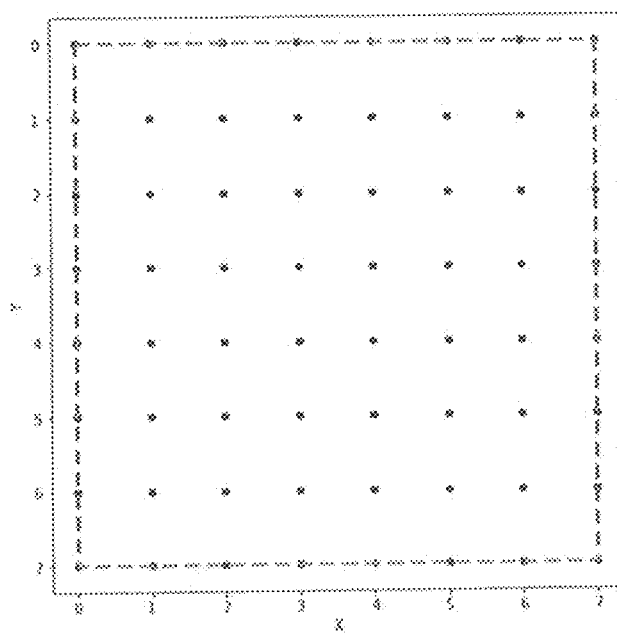
FIG. 17B It depicts an explanatory diagram for explaining a search range.

It should be noted that when a range search is performed using a space-filling curve, the search area is not necessarily rectangular (refer to FIG. 17B and FIG. 17C), for example, in a two-dimensional space. This is because when using a space-filling curve, the range is set in a one-dimensional space-filling curve, not in a two-dimensional space.

Figure 5A:
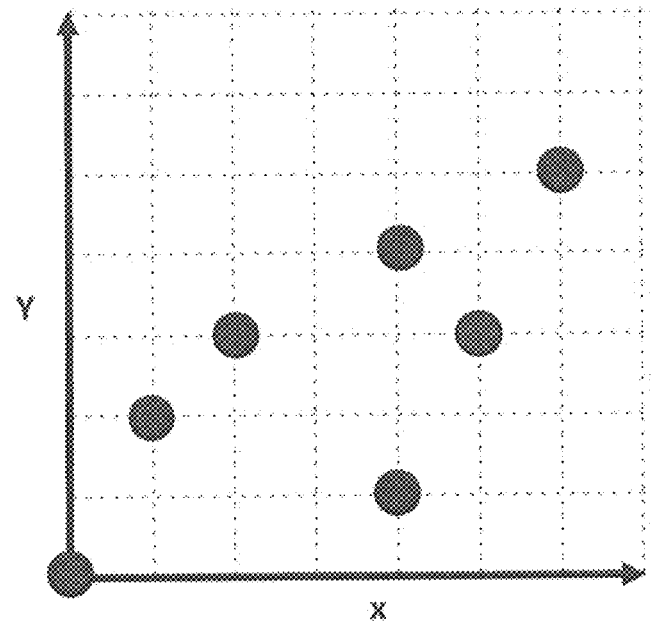
FIG. 5A It depicts an explanatory diagram for explaining a method for finding a neighbor point using the k-nearest neighbor algorithm.
Figure 5B:
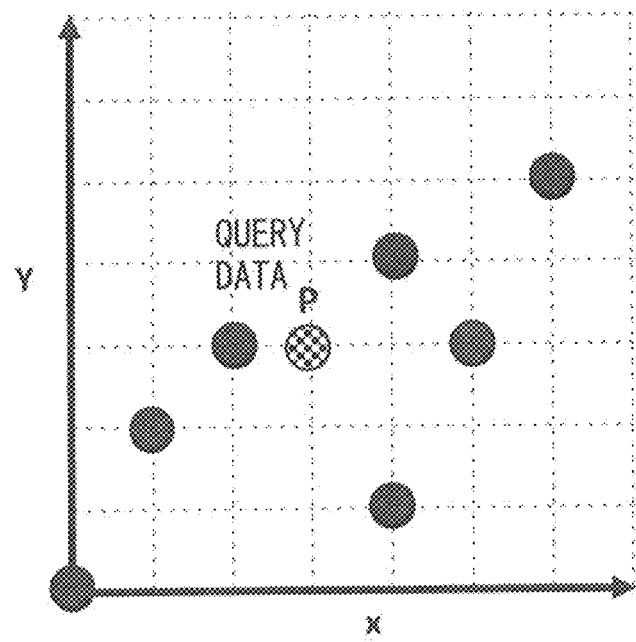
FIG. 5B It depicts an explanatory diagram for explaining a method for finding a neighbor point using the k-nearest neighbor algorithm.
Figure 5C:
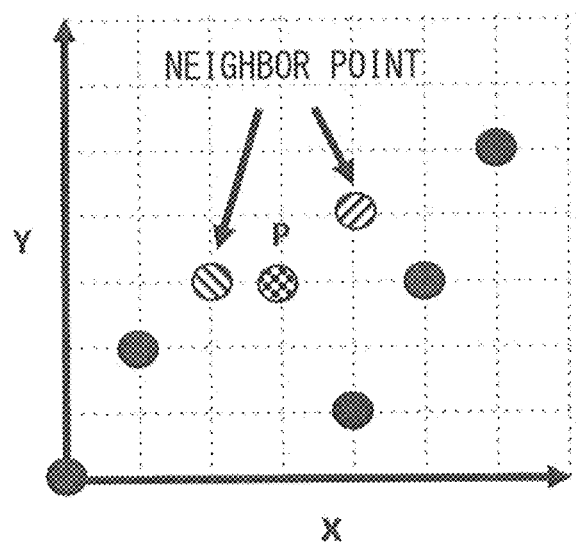
FIG. 5C It depicts an explanatory diagram for explaining a method for finding a neighbor point using the k-nearest neighbor algorithm.

Next, a method for finding a neighbor point using the k-nearest neighbor algorithm will be explained. FIG. 5A to FIG. 5C are explanatory diagrams for explaining a method for finding a neighbor point using the k-nearest neighbor algorithm. Suppose that seven pieces of training data as illustrated in FIG. 5A exist on a two-dimensional plane. In addition, suppose that query data is given as illustrated in FIG. 5B. Assume that two neighbor points of the query data are to be found.

When using a primitive method (a method without using a space-filling curve), the distances between the query data and the seven training data are calculated. Then, the two training data for the smaller distances are determined to be the neighbor points (refer to FIG. 5C).

Figure 6A:
FIG. 6A It depicts an explanatory diagram for explaining the determination of the search range based on the space-filling curve.
Figure 6B:
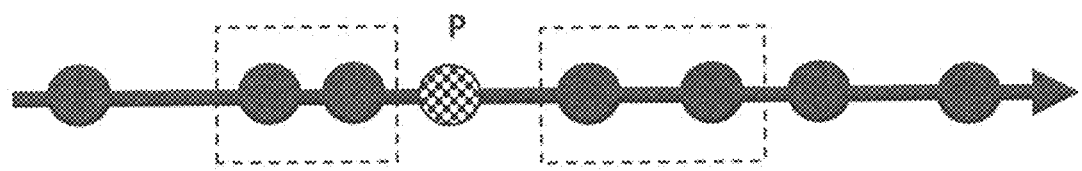
FIG. 6B It depicts an explanatory diagram for explaining the determination of the search range based on the space-filling curve.
Figure 6C:
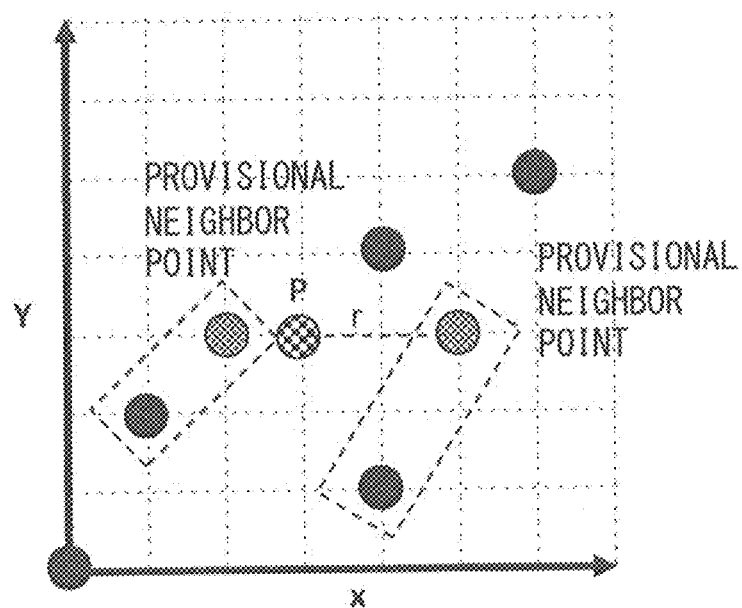
FIG. 6C It depicts an explanatory diagram for explaining the determination of the search range based on the space-filling curve.

Next, the k-nearest neighbor algorithm which uses range search based on the space-filling curve will be explained. FIG. 6A to FIG. 6C are explanatory diagrams for explaining the determination of the search range based on the space-filling curve. In FIG. 6A to FIG. 6B, an arrow indicates a space-filling curve. Black circles indicate training data. A circle with black dots inside indicates query data (point P). This notation will also be used in FIG. 8 described below.

As shown in FIG. 6A, suppose that there are seven training data on the space-filling curve and that the query data, denoted by P, is given. Then, take the case of finding two neighbor points for the query data (case k=2) as an example. When a primitive method is used, a distance between each of the seven training data and the query data is calculated.

When using the range search technique, some points (training data) around the query data are selected. FIG. 6B shows an example where two points close to point P on the right side and two points close to point P on the left side are selected. Then, the distance in the two-dimensional plane between each of the four selected points and the point P is calculated (refer to FIG. 6C).

Four distances are ordered from shortest to longest. The kth (in this example, second) distance is referred to as a provisional neighbor ball radius. The provisional neighbor ball radius is converted to an integer. For example, the provisional neighbor ball radius is made an integer by the ceiling function (a function that returns the smallest integer greater than or equal to a number). The integer value is denoted by r.

Figure 7:
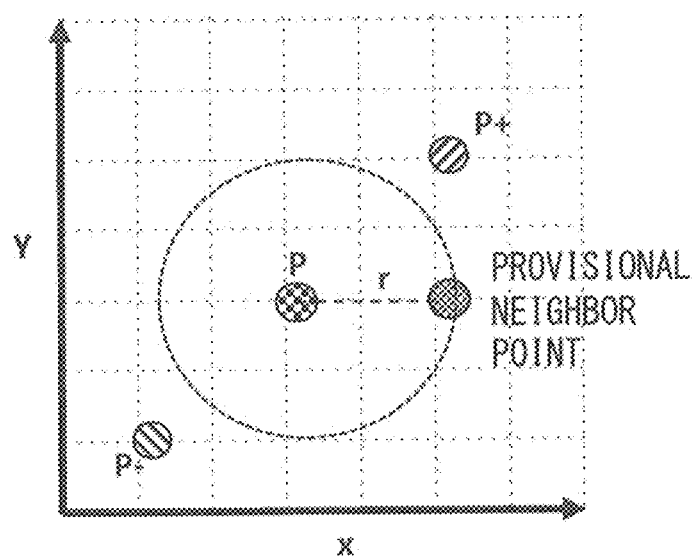
FIG. 7 It depicts an explanatory diagram for explaining the method of determining the search area.

FIG. 7 is an explanatory diagram for explaining the method of determining the search area. The point indicated by subtracting r from each numerical value (element) of the n-dimensional data representing the point P is a P− point. The point indicated by the value obtained by adding r to each numerical value (element) of the n-dimensional data is a P+ point. The P− point is considered to be the beginning of the candidate area. The P+ point is considered the end of the candidate area. The area between the P− point and P+ point corresponds to the neighbor range set by the candidate area determination unit 13.

Figure 8:
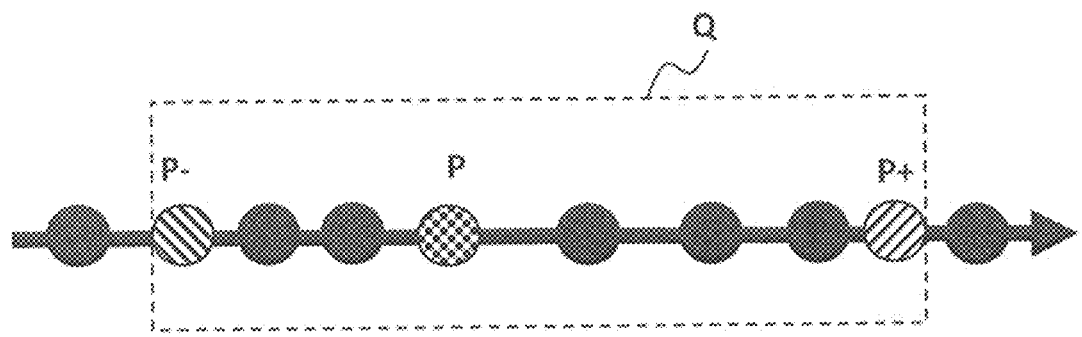
FIG. 8 It depicts an explanatory diagram for explaining how to determine the search range in the space-filling curve.

FIG. 8 is an explanatory diagram for explaining a specific method of determining the search area on the space-filling curve. As shown in FIG. 8, the training data and query data are mapped onto a space-filling curve. In the space-filling curve, where the P− point and the P+ point are located is determined, for example, by a binary search. In the space-filling curve, the k neighbor point to the query data always exist between the P− point and P+ point (range Q).

Figure 9:
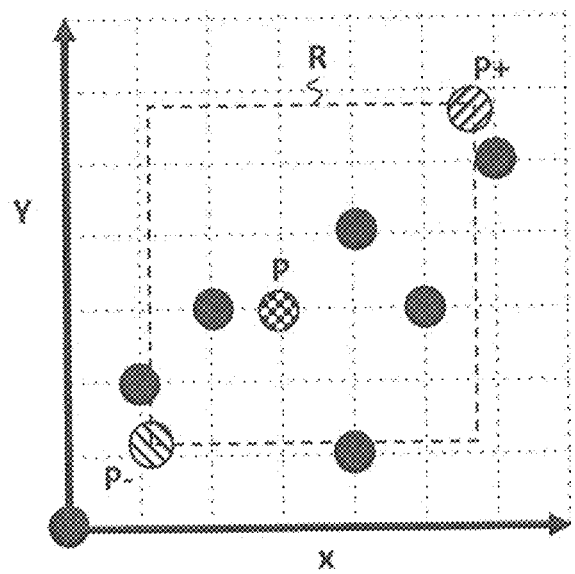
FIG. 9 It depicts an explanatory diagram showing the search area in a two-dimensional plane corresponding to the search range in the space-filling curve.

FIG. 9 is an explanatory diagram showing a search area in a two-dimensional plane corresponding to the search area (specifically, the candidate area) in the space-filling curve illustrated in FIG. 8. FIG. 9 shows the arrangement, in the two-dimensional plane, of the training data, the query data, the P− point and the P+ points in the space-filling curve illustrated in FIG. 8.

As described below, the distance calculation unit 15 calculates a distance between the query data and each of the multiple training data, for example, to find the neighbor points of the query data. In this example embodiment, the distance calculation unit 15 calculates a distance between the query data and each of the training data that exists between the P− point and the P+ point in the two-dimensional plane. Therefore, since the number of objects for distance calculation is reduced, the amount of calculation for distance calculation is reduced.

As mentioned above, when a range search is performed using a space-filling curve, the search area is not necessarily a rectangle in two-dimensional space (refer to FIG. 4B). This is because when a space-filling curve is used, the range is set in a one-dimensional space-filling curve, not in a two-dimensional space.

Figure 10A:
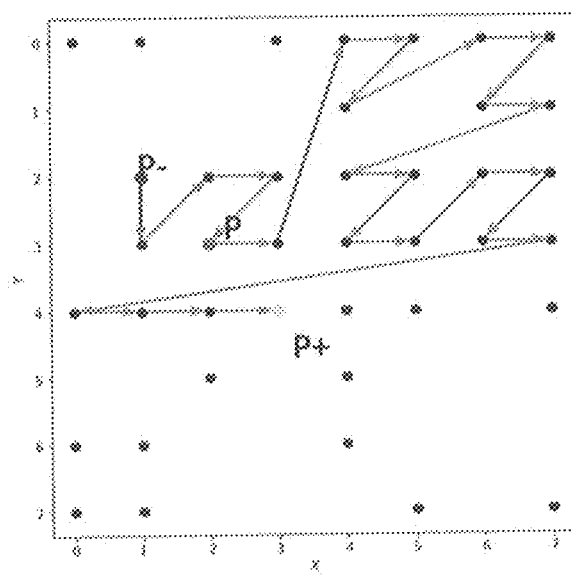
FIG. 10A It depicts an explanatory diagram showing a point included in the search area set using the space-filling curve.
Figure 10B:
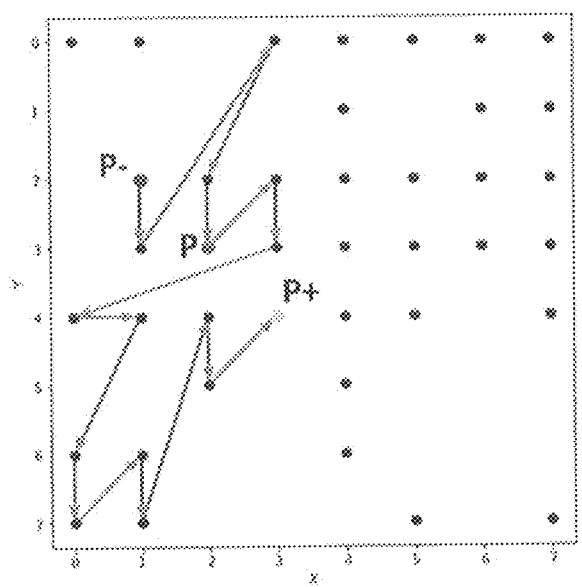
FIG. 10B It depicts an explanatory diagram showing a point included in the search area set using the space-filling curve.
Figure 10C:
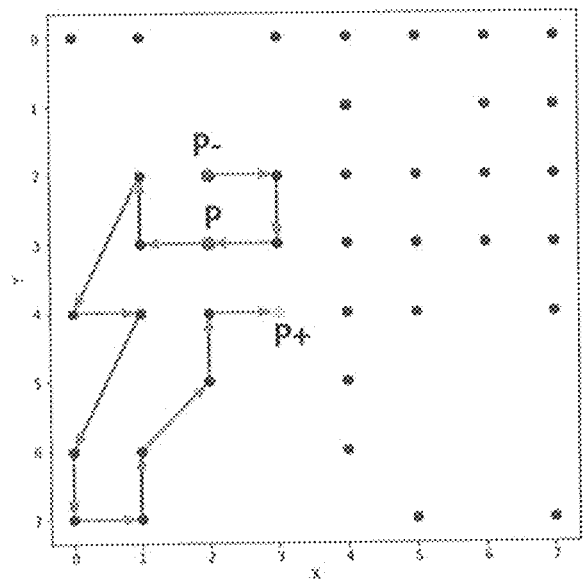
FIG. 10C It depicts an explanatory diagram showing a point included in the search area set using the space-filling curve.

FIG. 10A to FIG. 10C are explanatory diagrams showing points included in the search area set using the space-filling curve. In the example shown in FIG. 10A, a certain Z-curve is used. The two-dimensional data is mapped to one-dimensional data and sorted by the Z-curve. In FIG. 10A, the point P indicates the query data. The provisional neighbor ball radius is set to 1. In the example shown in FIG. 10A, the area from P− point to P+ point includes 22 pieces of data (for example, training data).

In the example shown in FIG. 10B, another Z-curve is used. The two-dimensional data is mapped to the one-dimensional data and sorted by the Z-curve. In FIG. 10B, the point P indicates the query data. The provisional neighbor ball radius is set to 1. In the example shown in FIG. 10B, the area from P− point to P+ point includes 13 pieces of data (for example, training data).

For example, when calculating the distance between each of the data in the area from P− point to P+ point and the query data, the amount of calculation required to use the Z-curve shown in FIG. 10B is less than that to use the Z-curve shown in FIG. 10A. That is, when calculating the distance between each of the data in a predetermined area and the query data, different shapes of Z-curves may result in different amounts of computation.

FIG. 10C shows an example in which a Hilbert curve is used as a space-filling curve. In the example shown in FIG. 10C, the area from P− point to P+ point includes 12 pieces of data (for example, training data). Therefore, when different space-filling curves are used, the search area may change and the amount of calculation to obtain the neighbor points of the query data may differ.

Figure 11:
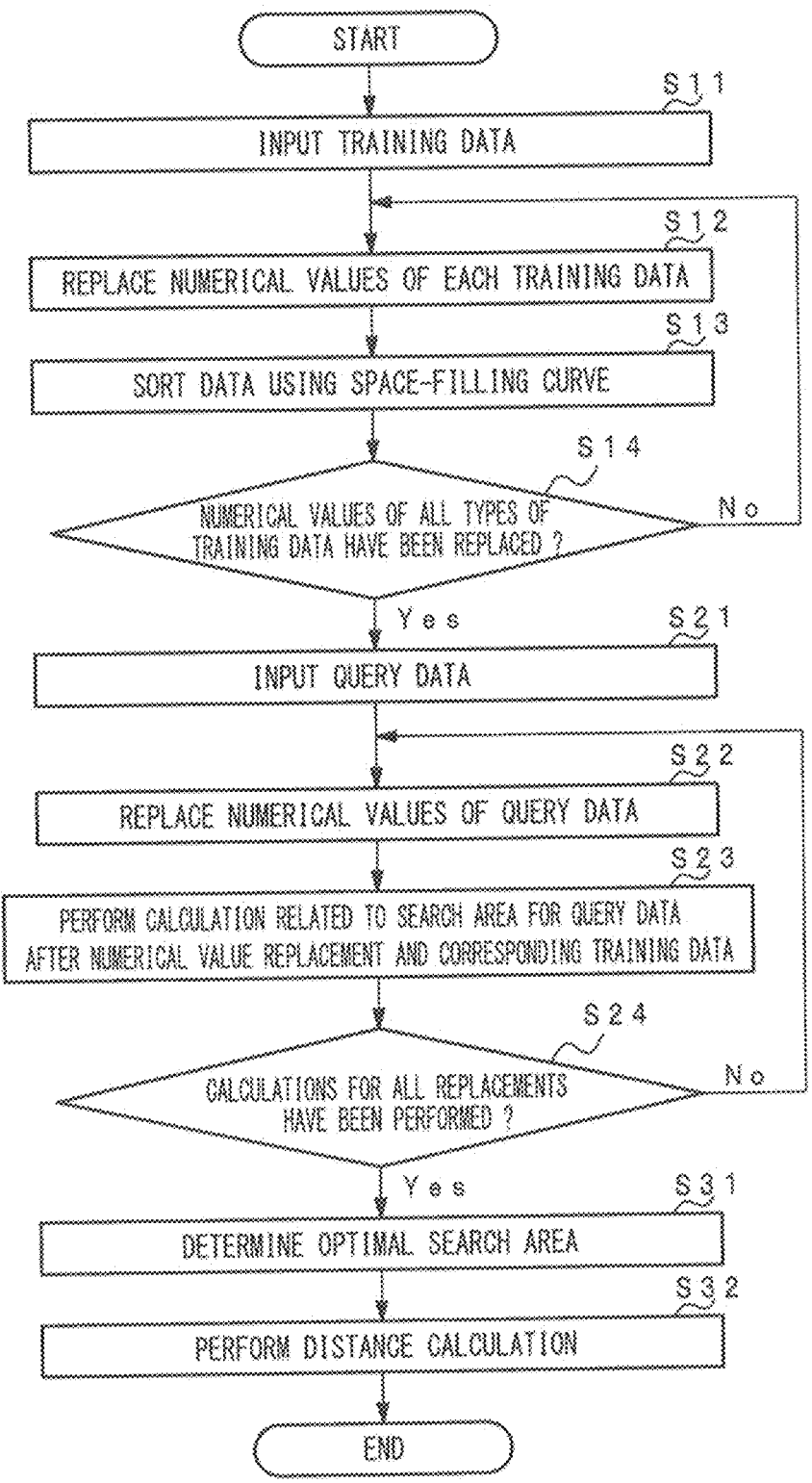
FIG. 11 It depicts a flowchart showing an operation of the range search device in the first example embodiment.

Next, the operation of the range search device 1 will be explained with reference to the flowchart in FIG. 11.

The numerical value replace unit 11 inputs multiple training data (step S11). The numerical value replace unit 11 replaces the numerical values (elements) of each of the input training data (step S12). For example, when the training data are three-dimensional data (x, y, z), the numerical value replace unit 11 replaces two or three of x, y, z. The numerical value replace unit 11 outputs information indicating which numerical values were replaced with the training data to the sorting unit 12.

The sorting unit 12 sorts pairs consisting of multiple training data after numerical value replacement using a space-filling curve (step S13). The type of numerical value replacement exists in the factorial of the dimension. For example, when the training data are three-dimensional data, there are 6 types (=3!) of numerical value replacement. The processing of steps S12 and S13 can be performed at most as many times as the factorial value of the dimension. In this example embodiment, the processing of steps S12 and S13 may be performed a predetermined number of times less than or equal to the factorial value of the dimension. It is assumed that the pair consisting of multiple input training data (original multiple training data) is also included in the pair consisting of multiple training data after numerical value replacement.

After the processing of steps S12 and S13 have been performed a predetermined number of times, the process moves to step S21 (step S14). That is, after the replacement process (processing of step S12) of numerical value has been performed a predetermined number of times (less than or equal to the number of times corresponding to the factorial value of the dimension), the process moves to step S21. When the number of times the processing of steps S12 and S13 has been performed is less than the predetermined number of times, the processing of steps S12 and S13 is performed again. In the processing of step S12 which is performed again, the numerical value replace unit 11 performs the numerical value replacement of the type that has not yet been used.

The sorting unit 12 outputs the multiple training data to the candidate area determination unit 13. Further, the sorting unit 12 outputs information indicating which numerical value has been replaced for each of the numerical value replacement processes (processing of step S12) that have been performed a predetermined number of times, the mapping result (position) on the space filling curve of each training data, and the index information before and after sorting of each training data to the candidate area determination unit 13.

In step S21, the candidate area determination unit 13 inputs the query data. Then, the candidate area determination unit 13, referring to the information input from the sorting unit 12, replaces the numerical values (elements) of the query data (step S22). When performing the processing of step S21, the candidate area determination unit 13 replaces the numerical values of the query data based on the information indicating which numerical values have been replaced, which is input from the sorting unit 12.

Next, the candidate area determination unit 13 performs calculations regarding the search area (step S23). The calculation regarding the search area is a process to obtain a candidate area for each type of numerical value replacement. For example, the candidate area determination unit 13 obtains candidate areas by the processes already described with reference to FIG. 6A to FIG. 6C and FIG. 7 to FIG. 9.

In the processing of step S23, the candidate area determination unit 13 uses query data whose numerical values are replaced by the same type of replacement that was applied to the training data.

When performing the process described with reference to FIG. 6A to FIG. 6C and FIG. 7 to FIG. 9, the candidate area determination unit 13 at least outputs each of the multiple candidate areas in the space-filling curve, the position of the training data in each candidate area, the position of the query data in each candidate area, the P-point, and the information that can identify the location of the P+ point in each candidate area to the search range determination unit 14.

When the processing of steps S22 and S23 have been executed for all replacements, the process moves to step S31. When the processing of steps S22 and S23 have not yet been executed for all replacements, the processing of steps S22 and S23 are executed again. In the process of step S22 which is executed again, the numerical value replace unit 11 executes the replacement of the types of numerical values that have not yet been used. It should be noted that "all replacements" correspond to all types of numerical value replacements used in the processing of step S12 multiple times.

In step S31, the search range determination unit 14 calculates the number of training data included in the area for each of the candidate areas input from the candidate area determination unit 13. The distance calculation unit 15 selects the candidate area with the lowest number of data included. The search range determination unit 14 sets the selected candidate area as the search area.

The distance calculation unit 15 calculates a distance between each of all training data and query data in the search area determined by the search range determination unit 14 (step S32). The distance calculation unit 15 selects k distances in descending order of value. Then, the distance calculation unit 15 sets the points where the data corresponding to the selected k distances are located as k neighbor points.

The effect of this example embodiment is described below. FIG. 12 is an explanatory diagram showing amount of calculation when using the k-nearest neighbor algorithm in the search area obtained using a space-filling curve. The upper row in FIG. 12 shows the amount of calculation when the k-nearest neighbor algorithm is used with one fixed space-filling curve. In other words, the upper row in FIG. 12 shows the amount of calculation when the way of thinking in this example embodiment is not applied. Each value shown in the upper row in FIG. 12 is the same as each value shown in FIG. 18.

The lower row in FIG. 12 shows the amount of calculation in this example embodiment.

Figures 17C, 18:
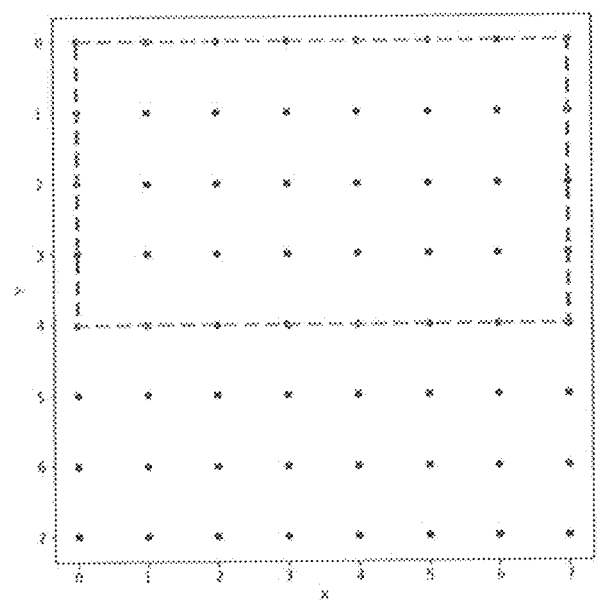
FIG. 17C It depicts an explanatory diagram for explaining a search range.
FIG. 18 It depicts an explanatory diagram showing amount of calculation when using the k-nearest neighbor algorithm in the search area obtained using a space-filling curve.

As in the case shown in FIG. 18, the number of data, dimensions and values are assumed to be the same with respect to the training data and query data. The number of the training data and the query data is set to 1,000,000. The values of the training data and query data are non-negative integers of [0, 1000000]. The training data and the query data are uniformly distributed, respectively. A Z-curve is used as the space-filling curve.

A computer simulation is performed with the number of neighbor points set to 2 and the number of dimensions of the data set to 2, 3, 4, and 5.

As shown in the lower row in FIG. 12, the amount of calculation is 0.0016 when the number of dimensions of the data is 2. The amount of calculation is about two-thirds of the value shown in the upper row of FIG. 12. In other words, the calculation speed is faster.

When the number of dimensions of the data is 3, the amount of calculation is 0.014. The amount of calculation is one-half of the value shown in the upper row in FIG. 12. When the number of dimensions of the data is 4, the amount of calculation is 0.0446. The amount of calculation is about one in two and a half of the value shown in the upper row of FIG. 12. When the number of dimensions of the data is 5, the amount of calculation is 0.0888. The amount of calculation is about one-third of the value shown in the upper row in FIG. 12. In other words, even when the number of dimensions increases, the amount of calculation is reduced.

Therefore, the range search device 1 of this example embodiment can reduce the amount of calculation of the process of using range search with a space-filling curve.

Example Embodiment 2

Figure 13:
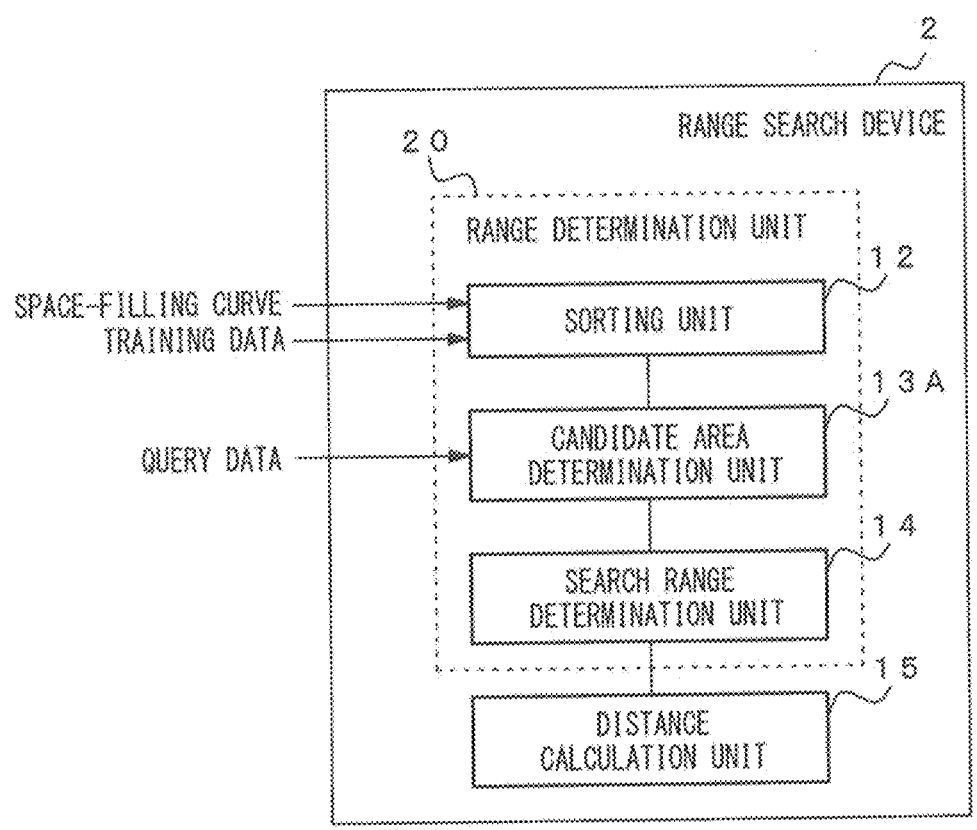
FIG. 13 It depicts a block diagram showing a configuration of the range search device of the second example embodiment.

FIG. 13 is a block diagram showing a configuration of the range search device of the second example embodiment. The range search device 2 shown in FIG. 13 includes a sorting unit 12, a candidate area determination unit 13A, a search range determination unit 14, and a distance calculation unit 15.

The sorting unit 12, the candidate area determination unit 13A, and the search range determination unit 14 constitute the range determination unit 20.

The sorting unit 12 maps the training data to a space-filling curve. That is, it obtains mapping of the training data on the space-filling curve. There are multiple training data.

In this example embodiment, multiple types of space-filling curves are input to the sorting unit 12. The multiple types of space-filling curves include, for example, a Z-curve and a Hilbert curve. The multiple types of space-filling curves may be stored in the range search device 2 in advance. In that case, for example, the multiple types of space-filling curves are stored in the sorting unit 12.

The sorting unit 12 sorts the training data using each of the multiple types of space-filling curves. The other processes performed by the sorting unit 12 are the same as those in the first example embodiment.

The candidate area determination unit 13A calculates a search area using the training data, query data, mapping results (positions) in each of the multiple types of space-filling curves of the training data, and index information before and after sorting the training data.

The search range determination unit 14 and the distance calculation unit 15 perform the same processes as in the first example embodiment.

Figure 14:
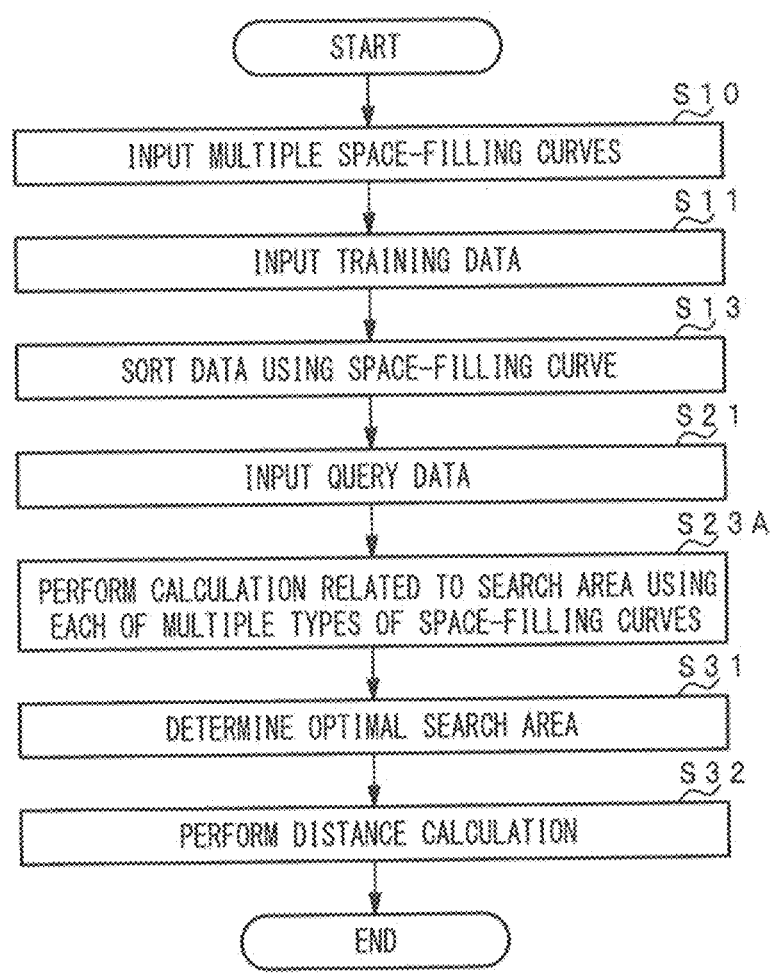
FIG. 14 It depicts a flowchart showing an operation of the range search device in the second example embodiment.

Next, the operation of the range search device 2 will be explained with reference to the flowchart in FIG. 14.

The sorting unit 12 inputs multiple types of space-filling curves (step S10). When the sorting unit 12 has stored multiple types of space-filling curves in advance, the processing of step S10 is unnecessary. In this example embodiment, the multiple training data are input to the sorting unit 12 (step S11).

The sorting unit 12 sorts the multiple training data using each of the multiple types of space-filling curves (step S13). The mapping result (position) of each training data on the space-filling curve and the index information before and after sorting each training data are output to the candidate area determination unit 13A.

The candidate area determination unit 13A inputs query data (step S21). Next, the candidate area determination unit 13A performs calculation regarding the search area (step S23A). The calculation regarding the search area is a process to obtain a candidate area using each of the multiple space-filling curves. For example, the candidate area determination unit 13A obtains a candidate area by the process described with reference to FIG. 6A to FIG. 6C and FIG. 7 to FIG. 9.

When the candidate area determination unit 13 executes the process described with reference to FIG. 6A to FIG. 6C and FIG. 7 to FIG. 9, the candidate area determination unit 13 at least outputs information that can identify the candidate areas in each of the multiple types of space filling curves, the position of the training data in each candidate area, the position of the query data in each candidate area, the P-point in each candidate area, and the position of P+ point in each candidate area to the search range determination unit 14.

The search range determination unit 14 and the distance calculation unit 15 perform the same process as in the first example embodiment (steps S31, S32).

The effects of this example embodiment are described below. In this example embodiment, the range search device 2 performs the mapping of the training data to a one-dimensional space and sorting using each of multiple types of space-filling curves. As described above, when different space-filling curves are used, the amount of calculation to obtain the neighbor points of the query data may differ even if the search area is the same. Specifically, the number of training data in the search area may differ.

Therefore, the range search device 2 can reduce the amount of calculation of the process of using range search with a space-filling curve by selecting the candidate area with the smallest number of training data in the area as a search area. In addition, since each of the multiple types of space-filling curves has a different shape, it may be possible to determine a search area with a smaller number of included training data than in the first example embodiment, which is expected to reduce the amount of calculation even further.

Each component in each of the above example embodiments may be configured with a single piece of hardware, but can also be configured with a single piece of software. Alternatively, the components may be configured with a plurality of pieces of hardware or a plurality of pieces of software. Further, part of the components may be configured with hardware and the other part with software.

The functions (processes) in the above example embodiments may be realized by a computer having one or more processors such as one or more central processing units (CPUs), a memory, etc. For example, a program for performing the method (processing) in the above example embodiments may be stored in a storage device (storage medium), and the functions may be realized with the CPU executing the program stored in the storage device.

Figure 15:
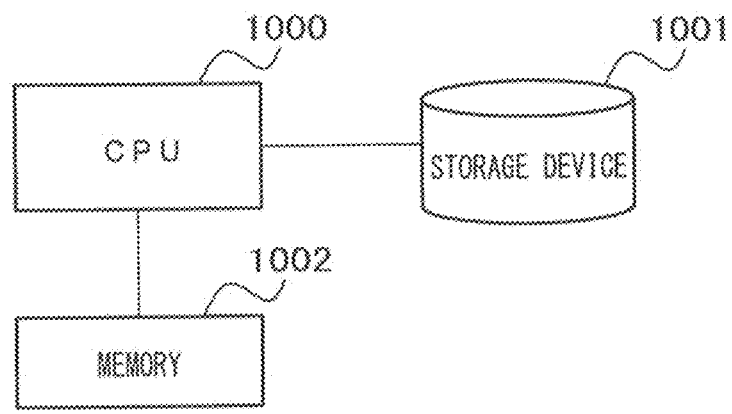
FIG. 15 It depicts a block diagram showing an example of a computer with a CPU.

FIG. 15 is a block diagram of a computer with a CPU. The computer is implemented in the range search device. A CPU 1000 executes processing in accordance with a program stored in a storage device 1001 to realize the functions of the numerical value replace unit 11, the sorting unit 12, the candidate area determination units 13, 13A, the search range determination unit 14, and the distance calculation unit 15 in the above example embodiment. The CPU 1000 can also realize the functions of the range determination units 10 and 20.

The storage device 1001 is, for example, a non-transitory computer readable media. The non-transitory computer readable medium is one of various types of tangible storage media. Specific examples of the non-transitory computer readable media include a magnetic storage medium (for example, flexible disk, magnetic tape, hard disk), a magneto-optical storage medium (for example, magneto-optical disc), a compact disc-read only memory (CD-ROM), a compact disc-recordable (CD-R), a compact disc-rewritable (CD-R/W), and a semiconductor memory (for example, a mask ROM, a programmable ROM (PROM), an erasable PROM (EPROM), a flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 16:
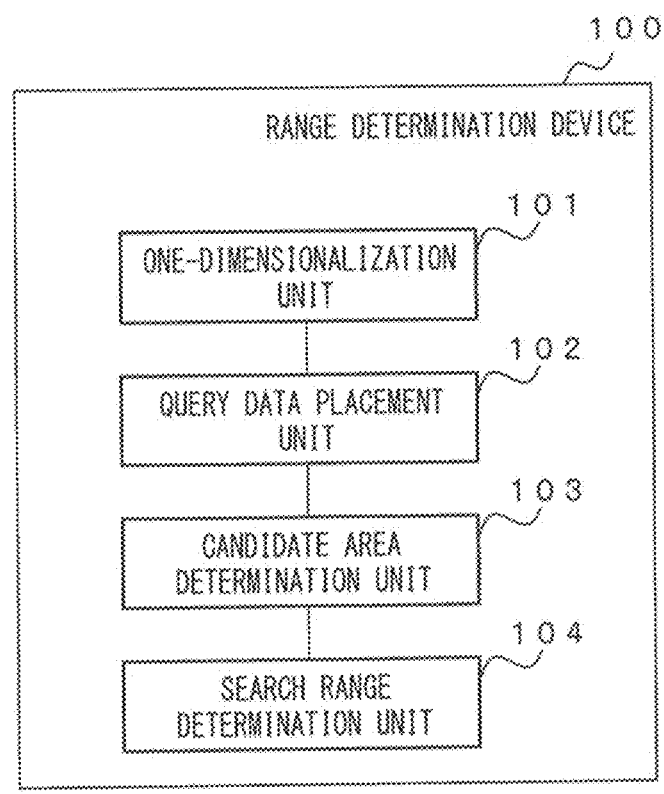
FIG. 16 It depicts a block diagram showing the main part of the range determination device.

FIG. 16 is a block diagram showing the main part of the range determination device. A range determination device 100 (in the example embodiments, realized by the range determination units 10 and 20) shown in FIG. 16 comprises a one-dimensionalization unit (one-dimensionalization means) 101 (in the example embodiments, realized by the numerical value replace unit 11 and the sorting unit 12) which generates multiple types of one-dimensional data from multiple multi-dimensional data (for example, training data that is two-dimensional data) using each of multiple space-filling curves, a query data placement unit (query data placement means) 102 which places query data on each of the multiple space-filling curves on which the one-dimensional data is placed:

candidate area determination means which determines a neighbor range of the query data on each of the multiple space-filling curves, and sets an area on each of multiple multi-dimensional planes corresponding to the neighbor range as a candidate area; and search range determination means which determines an area with the smallest number of included data among multiple candidate areas as a search area a one-dimensionalization unit (one-dimensionalization means) 101 (in the example embodiment, realized by the numerical value replace unit 11 and the sorting unit 12) which generates multiple types of one-dimensional data from multiple multi-dimensional data (for example, training data that is two-dimensional data) using each of multiple space-filling curves, a query data placement unit (query data placement means) 102 (in the example embodiment, realized by the candidate area determination units 13 and 13A) which places query data on each of the multiple space-filling curves on which the one-dimensional data is placed, a candidate area determination unit (candidate area determination means) 103 (in the example embodiment, realized by the candidate area determination units 13 and 13A) which determines a neighbor range of the query data on each of the multiple space-filling curves, and sets an area on each of multiple multi-dimensional planes corresponding to the neighbor range as a candidate area, and a search range determination unit (search range determination means) 104 (in the example embodiment, realized by the search range determination unit 14) which determines an area with the smallest number of included data among multiple candidate areas as a search area.

A part of or all of the above example embodiments may also be described as, but not limited to, the following supplementary notes.

(Supplementary note 1) A range determination device comprising:

one-dimensionalization means for generating multiple types of one-dimensional data from multiple multi-dimensional data using each of multiple space-filling curves;

query data placement means for placing query data on each of the multiple space-filling curves on which the one-dimensional data is placed;

candidate area determination means for determining a neighbor range of the query data on each of the multiple space-filling curves, and setting an area on each of multiple multi-dimensional planes corresponding to the neighbor range as a candidate area; and search range determination means for determining an area with the smallest number of included data among multiple candidate areas as a search area.

(Supplementary note 2) The range determination device according to Supplementary note 1, wherein the one-dimensionalization means generates multiple sets consisting of multiple data by replacing numerical values for each of the multiple data in the multi-dimensional plane, and generates the multiple types of one-dimensional data by mapping each set of multiple data to a one-dimensional space using one type of space-filling curve, and the query data placement means generates multiple types of query data by replacing the numerical values of the query data in the multi-dimensional plane, and places each query data on the space-filling curve.

(Supplementary note 3) The range determination device according to Supplementary note 1, wherein the multiple space-filling curves are multiple types of space-filling curves.

(Supplementary note 4) The range search device according to Supplementary note 1, further comprising distance calculation means for calculating a distance between each of multiple data included in the search area in the multi-dimensional plane and query data, and selects a predetermined number of data corresponding to the smallest distance or distances among the multiple distances.

(Supplementary note 5) A range determination method comprising:

generating multiple types of one-dimensional data from multiple multi-dimensional data using each of multiple space-filling curves;

placing query data on each of the multiple space-filling curves on which the one-dimensional data is placed;

determining a neighbor range of the query data on each of the multiple space-filling curves, and setting an area on each of multiple multi-dimensional planes corresponding to the neighbor range as a candidate area; and determining an area with the smallest number of included data among multiple candidate areas as a search area.

(Supplementary note 6) The range determination method according to Supplementary note 5, further comprising generating multiple sets consisting of multiple data by replacing numerical values for each of the multiple data in the multi-dimensional plane, and generating the multiple types of one-dimensional data by mapping each set of multiple data to a one-dimensional space using one type of space-filling curve, and generating multiple types of query data by replacing the numerical values of the query data in the multi-dimensional plane, and placing each query data on the space-filling curve.

(Supplementary note 7) The range determination method according to Supplementary note 5, wherein the multiple space-filling curves are multiple types of space-filling curves.

(Supplementary note 8) The range search method according to Supplementary note 5, further comprising calculating a distance between each of multiple data included in the search area in the multi-dimensional plane and query data, and selecting a predetermined number of data corresponding to the smallest distance or distances among the multiple distances.

(Supplementary note 9) A computer readable storage medium for storing a range determination program for causing a computer to execute:

generating multiple types of one-dimensional data from multiple multi-dimensional data using each of multiple space-filling curves;

placing query data on each of the multiple space-filling curves on which the one-dimensional data is placed;

determining a neighbor range of the query data on each of the multiple space-filling curves, and setting an area on each of multiple multi-dimensional planes corresponding to the neighbor range as a candidate area; and determining an area with the smallest number of included data among multiple candidate areas as a search area.

(Supplementary note 10) The computer readable storage medium according to Supplementary note 9, wherein the range determination program causes the computer to execute generating multiple sets consisting of multiple data by replacing numerical values for each of the multiple data in the multi-dimensional plane, and generating the multiple types of one-dimensional data by mapping each set of multiple data to a one-dimensional space using one type of space-filling curve, and generating multiple types of query data by replacing the numerical values of the query data in the multi-dimensional plane, and placing each query data on the space-filling curve.

(Supplementary note 11) The computer readable storage medium according to Supplementary note 9, wherein the multiple space-filling curves are multiple types of space-filling curves.

(Supplementary note 12) A range determination program for causing a computer to execute:

generating multiple types of one-dimensional data from multiple multi-dimensional data using each of multiple space-filling curves;

placing query data on each of the multiple space-filling curves on which the one-dimensional data is placed;

determining a neighbor range of the query data on each of the multiple space-filling curves, and setting an area on each of multiple multi-dimensional planes corresponding to the neighbor range as a candidate area; and determining an area with the smallest number of included data among multiple candidate areas as a search area.

(Supplementary note 13) The range determination program according to Supplementary note 12, wherein the range determination program causes the computer to execute generating multiple sets consisting of multiple data by replacing numerical values for each of the multiple data in the multi-dimensional plane, and generating the multiple types of one-dimensional data by mapping each set of multiple data to a one-dimensional space using one type of space-filling curve, and generating multiple types of query data by replacing the numerical values of the query data in the multi-dimensional plane, and placing each query data on the space-filling curve.

(Supplementary note 14) The range determination program according to Supplementary note 12, wherein the multiple space-filling curves are multiple types of space-filling curves.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST 1, 2 Range search device
10, 20 Range determination unit
11 Numerical value replace unit
12 Sorting unit
13, 13A Candidate area determination unit
14 Search range determination unit
15 Distance calculation unit
100 Range determination device
101 One-dimensionalization unit
102 Query data placement unit
103 Candidate area determination unit
104 Search range determination unit
1000 CPU
1001 Storage device
1002 Memory

What is claimed is:

1. A range determination device comprising:
a memory storing software instructions, and
one or more processors configured to execute the software instructions to:
generate multiple types of one-dimensional data from multiple multi-dimensional data using each of multiple space-filling curves;
place query data on each of the multiple space-filling curves on which the one-dimensional data is placed;
generate multiple sets consisting of multiple data by replacing numerical values for each of the multiple data in the multi-dimensional plane, wherein the multiple data correspond to the query data, and generate the multiple types of one-dimensional data by mapping each set of multiple data to a one-dimensional space using one type of space-filling curve;
generate multiple types of query data by replacing the numerical values of the query data in the multi-dimensional plane, and place each query data on the space-filling curve;
determine a neighbor range of the query data on each of the multiple space-filling curves, and set an area on each of multiple multi-dimensional planes corresponding to the neighbor range as a candidate area; and
determine an area with the smallest number of included data among multiple candidate areas as a search area.

2. The range determination device according to claim 1, wherein
the multiple space-filling curves are multiple types of space-filling curves.

3. The range search device according to claim 1, wherein the one or more processors are further configured to execute the software instructions to
calculate a distance between each of multiple data included in the search area in the multi-dimensional plane and query data, and select a predetermined number of data corresponding to the smallest distance or distances among the multiple distances.

4. A range determination method comprising:
generating multiple types of one-dimensional data from multiple multi-dimensional data using each of multiple space-filling curves;
placing query data on each of the multiple space-filling curves on which the one-dimensional data is placed;
generating multiple sets consisting of multiple data by replacing numerical values for each of the multiple data in the multi-dimensional plane, wherein the multiple data correspond to the query data, and generating the multiple types of one-dimensional data by mapping each set of multiple data to a one-dimensional space using one type of space-filling curve,
generating multiple types of query data by replacing the numerical values of the query data in the multi-dimensional plane, and placing each query data on the space-filling curve;
determining a neighbor range of the query data on each of the multiple space-filling curves, and setting an area on each of multiple multi-dimensional planes corresponding to the neighbor range as a candidate area; and
determining an area with the smallest number of included data among multiple candidate areas as a search area.

5. The range determination method according to claim 4, wherein
the multiple space-filling curves are multiple types of space-filling curves.

6. The range search method according to claim 4, further comprising
calculating a distance between each of multiple data included in the search area in the multi-dimensional plane and query data, and selecting a predetermined number of data corresponding to the smallest distance or distances among the multiple distances.

7. A non-transitory computer readable storage medium for storing a range determination program for causing a computer to execute:
generating multiple types of one-dimensional data from multiple multi-dimensional data using each of multiple space-filling curves;
placing query data on each of the multiple space-filling curves on which the one-dimensional data is placed;
generating multiple sets consisting of multiple data by replacing numerical values for each of the multiple data in the multi-dimensional plane, wherein the multiple data correspond to the query data, and generating the multiple types of one-dimensional data by mapping each set of multiple data to a one-dimensional space using one type of space-filling curve;
generating multiple types of query data by replacing the numerical values of the query data in the multi-dimensional plane, and placing each query data on the space-filling curve;
determining a neighbor range of the query data on each of the multiple space-filling curves, and setting an area on each of multiple multi-dimensional planes corresponding to the neighbor range as a candidate area; and
determining an area with the smallest number of included data among multiple candidate areas as a search area.

8. The non-transitory computer readable storage medium according to claim 7, wherein the multiple space-filling curves are multiple types of space-filling curves.

* * * * *